June 22, 1954 E. W. SCHWITTEK 2,682,035
LINEAR FREQUENCY SHIFT KEYING CIRCUIT
Filed Oct. 26, 1950

INVENTOR.
ELMER W. SCHWITTEK
BY Marvin Moody
Atty.

Patented June 22, 1954

2,682,035

UNITED STATES PATENT OFFICE 2,682,035

LINEAR FREQUENCY SHIFT KEYING CIRCUIT

Elmer W. Schwittek, Cedar Rapids, Iowa, assignor to Collins Radio Company, Cedar Rapids, Iowa, a corporation of Iowa Application October 26, 1950, Serial No. 192,273

4 Claims. (Cl. 332—29)

This invention relates in general to frequency shift keying apparatus.

It is an object of this invention to provide a frequency shift keyer which may be varied in frequency in a linear manner with respect to the magnitude of a controlling voltage.

Another object of this invention is to provide a linear frequency shift keyer that feeds back a reactive component of a voltage to a master oscillator to vary its frequency linearly with respect to a control voltage.

Still another object of this invention is to provide a linear frequency shift keyer which makes use of phase shifters and feedback therefrom to change the frequency of the oscillator.

A feature of this invention is found in the provision for a phase shifting circuit which receives the output of an oscillator, a balanced clipper which has its clipping level varied in response to a control voltage, and a feedback supplied from the clipper to the oscillator for keying the oscillator in a linear manner with respect to magnitude of a keying voltage.

Figure 1:
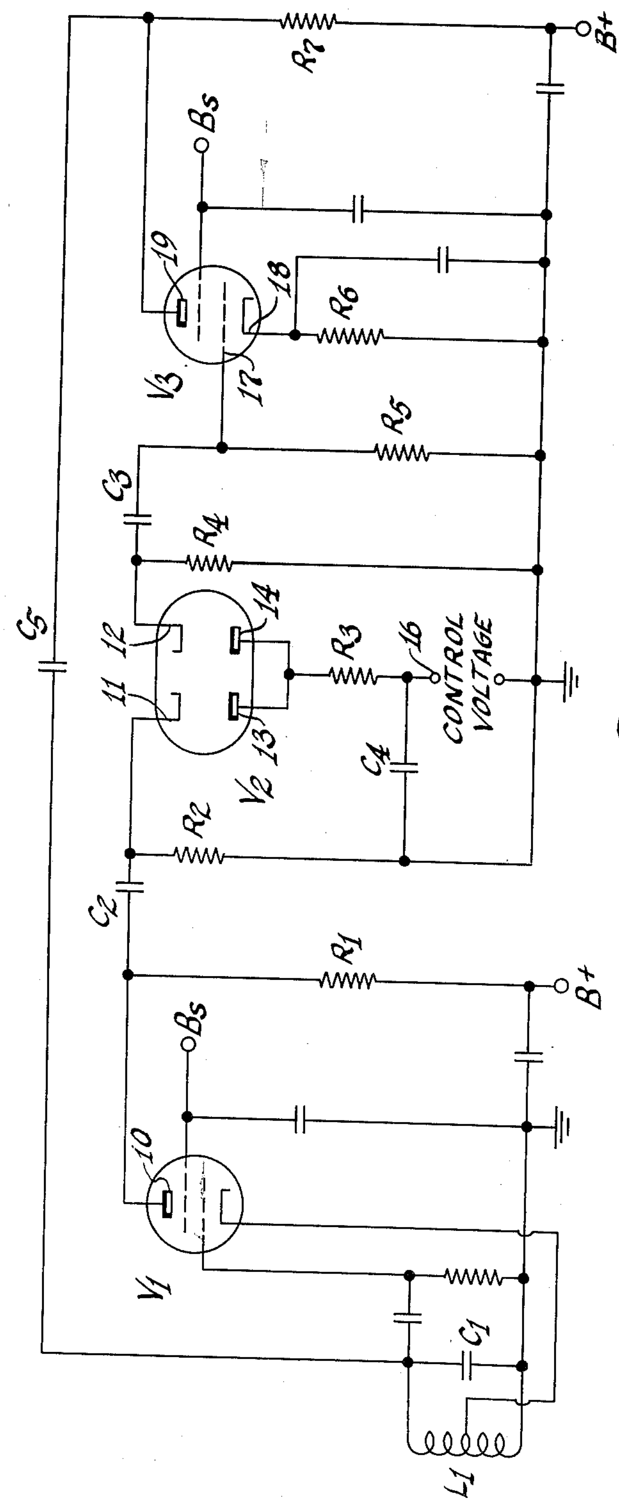
Figure 2:
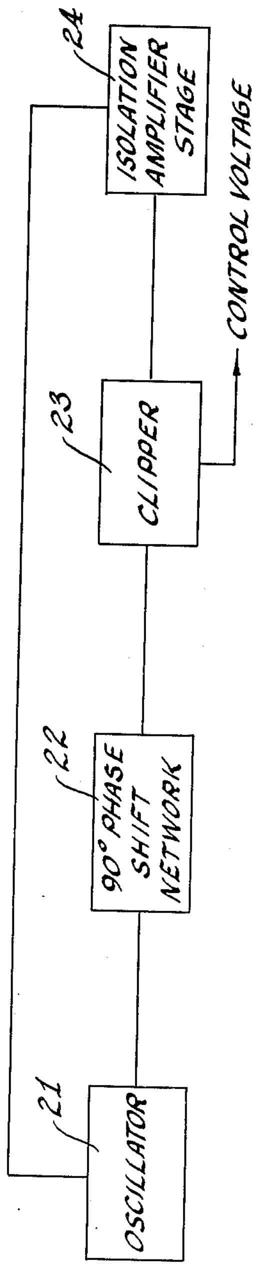

Further objects, features, and advantages of this invention will become apparent from the following description and claims when read in view of the drawings, in which:

Figure 1 is a wiring diagram of the linear frequency shift keying apparatus of this invention; and, Figure 2 is a schematic diagram of the linear frequency shift keying apparatus.

Figure 1 shows an L-C controlled oscillator comprising a tube $V_1$, the inductance $L_1$, and capacitance $C_1$. The frequency of oscillation of the oscillator is determined by the values of $L_1$ and $C_1$, which may be variable if desired. The output of the oscillator appears across $R_1$ which is in the plate circuit of tube $V_1$. The plate 10 of tube $V_1$ is connected to a phase shifter comprising a capacitor $C_2$ and resistors $R_2$ and $R_4$. The opposite side of resistor $R_2$ is connected to ground. A mid-point between $C_2$ and $R_2$ is connected to the cathode 11 of one-half of a double diode $V_2$ which comprises a clipper circuit. The other cathode 12 of the tube $V_2$ is connected to a second phase shifter circuit comprising condenser $C_3$ and resistor $R_5$. The plates 13 and 14, respectively, of the tube $V_2$ are tied together and connected to a resistor $R_3$ which has its opposite side connected to a terminal 16. A condenser $C_4$ is connected between terminal 16 and ground. A third tube $V_3$ has its control grid 17 connected to the point between $C_3$ and $R_5$ and its cathode 18 is connected to ground through the resistance $R_6$. Its plate

19 supplies a feedback to the controlling tank circuit $L_1$ and $C_1$ through a coupling condenser $C_5$. The plate 19 is also connected to B+ through the resistor $R_7$.

In operation the output of tube $V_1$ is supplied to the clipper $V_2$ through the coupling condenser $C_2$. Resistors $R_2$ and $R_4$ are equal and therefore the clipper is balanced to ground. A control voltage is supplied between ground and terminal 16 to adjust the clipping level of the clipper. The output of the clipper is amplified by the isolation amplifier $V_3$ and fed back to the tank circuit comprising $L_1$ and $C_1$. The components of the phase shifting circuits comprising $C_2$, $C_3$, $R_2$, $R_4$ and $R_5$ are chosen so that they will shift a signal of the carrier frequency by 90 degrees. The tubes $V_1$ and $V_3$ shift the incoming signals the usual 180 degrees respectively or one full cycle, and thus, the total phase shift of the signal fed back to $L_1$, $C_1$ is 360 plus 90 degrees or 450 degrees. The adding of a signal shifted 450 degrees (same as 90 degrees) is to present an effective increase in capacitance and this causes the frequency of the oscillator to change. The amount of the frequency change depends upon the amount of capacitance fed back to the tank circuit and this in turn depends upon the control voltage supplied to terminal 16.

Figure 2 illustrates schematically an oscillator 21, a 90 degree phase shift network 22, a clipper 23 and an isolation amplifier 24. A control voltage varies the bias on the clipper and thus regulates the amplitude of the output in a linear manner. Clippers of this nature are well known to those skilled in the art, and any type which performs this function may be used.

A use for this invention is to reproduce a picture electronically. If a photoelectric cell is used to measure the varying intensity of a picture, the output of the cell might be used as the control voltage supplied to the terminal 16 to vary the frequency of the oscillator linearly. If the oscillator is used as a transmitter, it will transmit a frequency modulated signal which carries the information as to the density of the picture at various points. This information can be detected at a receiver and the picture reconstructed. The linear relationship between the density of the picture and the frequency shift makes possible reproduction. This example is given to show one way in which the apparatus of this invention might be used. It is to be understood, of course, that there are other uses for the invention.

The control voltage regulates the amplitude of the feedback signal and thus regulates the amount of frequency shift which occurs in the oscillator output. Thus, means are provided for shifting the frequency of a controlled oscillator in linear manner in response to a control voltage.

The exact types of L-C oscillator, clipper or amplifier are not critical. The clipper may be a shunt type as well as the series type. The phase shift networks may be capacitive or inductive.

Values of the various components may be, for example:

$C_2$—10 micromicrofarads
$C_3$—100 micromicrofarads
$C_4$—0.01 microfarad
$C_5$—100 micromicrofarads
B+—180 volts positive
$B_s$—100 volts positive
$R_1$—10,000 ohms
$R_2$—47,000 ohms
$R_3$—220,000 ohms
$R_4$—47,000 ohms
$R_5$—22,000 ohms
$R_6$—1,000 ohms
$R_7$—100,000 ohms
$V_1$—6BA6 Tube Type
$V_2$—6AL5 Tube Type
$V_3$—6BA6 Tube Type Although this invention has been described with respect to particular embodiments thereof it is not to be so limited as changes and modifications may be made therein which are within the full intended scope of the invention as defined by the appended claims.

I claim:

1. Means for varying the frequency of a frequency shift oscillator having a tank circuit comprising, a first degree phase shifter receiving an output of said oscillator, a clipper circuit receiving the output of said first phase shifter, a control voltage supplied to said clipper to vary its clipping level in response to a control signal, a second phase shifter receiving the output of said clipper, and the total phase shift of the first and second phase shifters being equal to 90 degrees, and the output of said second phase shifter furnished to the tank circuit of said oscillator.

2. Means for varying the frequency of an oscillator having a tank circuit comprising, phase shifting means receiving the output of said oscillator, clipping means receiving the output of said phase shifting means, a control voltage source supplying an output to the clipping means to vary its bias in response to the value of the controlled voltage and an output of said clipping means supplied to said oscillator.

3. Means for linearly shifting the frequency of a resonating-element-controlled oscillator comprising, 90 degree phase shifting means receiving the output of said oscillator, clipping means receiving the output of said phase shifting means, a control voltage supplied to said clipping means to vary the clipping level, keying means producing the control voltage and supplying it to the clipping means, and feedback means supplying an output of said clipper to the resonating element of the oscillator.

4. Means for linearly varying the frequency of an L-C tank circuit controlled oscillator comprising, phase-shifting means receiving an output of said oscillator to shift it ninety degrees, a clipping circuit receiving the output of said phase-shifting means, control means supplying a bias to said clipper to vary the clipping level, and the output of said clipper being connected to the L-C tank circuit to vary its resonant frequency.

References Cited in the file of this patent

UNITED STATES PATENTS

| Number | Name | Date |
|---|---|---|
| 2,490,026 | Buckbee | Dec. 6, 1949 |
| 2,498,678 | Grieg | Feb. 28, 1950 |
| 2,519,839 | Hurault | Aug. 22, 1950 |
| 2,552,140 | Boothroyd et al. | May 8, 1951 |
| 2,558,214 | Gardere et al. | June 26, 1951 |
| 2,566,405 | DeLange et al. | Sept. 4, 1951 |